(12) United States Patent
Chai et al.

(10) Patent No.: US 11,878,920 B2
(45) Date of Patent: Jan. 23, 2024

(54) STORMWATER RUNOFF TREATMENT SUBSTRATE AND STORMWATER BIORETENTION SYSTEM CONSTRUCTED BY USING SUBSTRATE

(71) Applicant: Chongqing University, Chongqing (CN)

(72) Inventors: Hongxiang Chai, Chongqing (CN); Zheng Kong, Chongqing (CN); Zhiyu Shao, Chongqing (CN); Jingchen Ma, Chongqing (CN)

(73) Assignee: CHONGQING UNIVERSITY, Chongqing (CN)

(*) Notice: Subject to any disclaimer, the term of this patent is extended or adjusted under 35 U.S.C. 154(b) by 85 days.

(21) Appl. No.: 17/458,622

(22) Filed: Aug. 27, 2021

(65) Prior Publication Data

US 2022/0064024 A1 Mar. 3, 2022

(30) Foreign Application Priority Data

Aug. 27, 2020 (CN) .......................... 202010878892.0

(51) Int. Cl.
| | | |
|---|---|---|
| C02F 1/28 | (2023.01) | |
| E03F 1/00 | (2006.01) | |
| E03F 5/14 | (2006.01) | |
| C02F 103/00 | (2006.01) | |

(52) U.S. Cl.
CPC ............... *C02F 1/288* (2013.01); *C02F 1/281* (2013.01); *C02F 1/283* (2013.01); *E03F 1/00* (2013.01); *E03F 5/14* (2013.01); *C02F 2103/001* (2013.01)

(58) Field of Classification Search
CPC .......... C02F 1/288; C02F 1/281; C02F 1/283; C02F 2103/001; C02F 3/2806; C02F 3/286; C02F 2101/105; C02F 2101/16; C02F 2101/30; C02F 2305/06; C02F 1/58; E03F 1/00; E03F 5/14
USPC .......................................................... 210/694
See application file for complete search history.

(56) References Cited

U.S. PATENT DOCUMENTS

| | | | | |
|---|---|---|---|---|
| 7,776,217 B2 * | 8/2010 | Lucas | ..................... | C02F 3/327 |
| | | | | 210/290 |
| 2017/0217787 A1 * | 8/2017 | Presby | ..................... | C02F 3/28 |

FOREIGN PATENT DOCUMENTS

| | | | | |
|---|---|---|---|---|
| CN | 107500414 A | * | 12/2017 | ............... C02F 3/32 |
| CN | 109384315 A | * | 2/2019 | ............... C02F 3/30 |
| CN | 110521439 A | * | 12/2019 | ............. A01G 24/10 |

OTHER PUBLICATIONS

Translation of CN109384315A_Yang_NPL.pdf (Year: 2019).*
Translation of CN107500414A_Song_NPL.pdf (Year: 2017).*
Translation of CN110521439A_He_NPL.pdf (Year: 2019).*

* cited by examiner

*Primary Examiner* — Ekandra S. Miller-Cruz
(74) *Attorney, Agent, or Firm* — MATTHIAS SCHOLL P.C.; Matthias Scholl

(57) ABSTRACT

A stormwater runoff treatment substrate includes a lower pyrite substrate layer and an upper biochar substrate layer. The lower pyrite substrate layer includes pyrite, oyster shell powder, and sandy materials in a volume ratio of 10:5:85. The upper biochar substrate layer includes biochar or activated carbon, organic nutrient soil, and sandy materials in a volume ratio of 20:3:77.

6 Claims, 1 Drawing Sheet

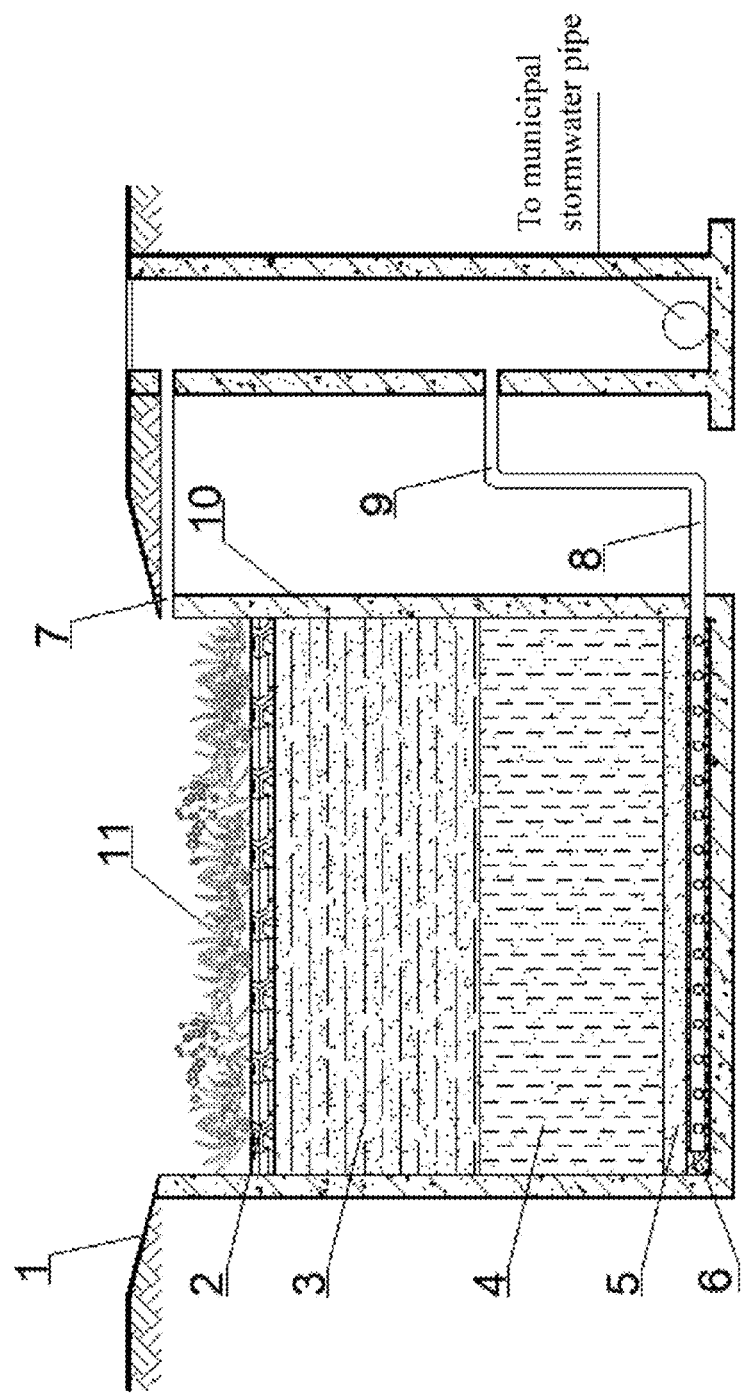

STORMWATER RUNOFF TREATMENT SUBSTRATE AND STORMWATER BIORETENTION SYSTEM CONSTRUCTED BY USING SUBSTRATE

CROSS-REFERENCE TO RELATED APPLICATIONS

Pursuant to 35 U.S.C. § 119 and the Paris Convention Treaty, this application claims foreign priority to Chinese Patent Application No. 202010878892.0 filed Aug. 27, 2020, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of stormwater treatment. Specifically, this disclosure relates to a substrate mixed with biochar and pyrite and a stormwater bioretention system constructed with those two substrates for stormwater runoff treatment.

Urbanization and global climate change greatly increased the impervious area of the urban surface in recent years, which leads to a series of problems such as urban waterlogging and non-point source pollution. Large amounts of nitrogen, phosphorus, and organic matter are carried by the excessive runoff into the receiving water, causing a series of environmental problems such as black and odorous water and eutrophication.

To solve those problems, several advanced stormwater management concepts and systems have been proposed, such as Low Impact Development (LID) in the United States, sponge cities in China (hereinafter collectively referred to as LID), etc. LID includes many decentralized infrastructures, such as permeable pavements, green roofs, constructed wetlands, and bioretention systems. Among them, the bioretention system has been widely studied and developed in recent years due to its simple structure and convenient maintenance. Several new bioretention technologies have been applied in large-scale engineering as well recently.

The existing stormwater bioretention system generally consists of sand or soil, with very limited pollutant treatment performance. They can only effectively remove particulate pollutants such as suspended solids, particulate nitrogen and phosphorus, and particulate organic matter. For dissolved pollutants such as dissolved phosphate, nitrate, etc., the removal performance was poor, sometimes even shows net leaching of them. Existing research and technology mainly use two ways to solve the above problems. The first is the construction of the reaction zone. The most common one is to set up an anaerobic submerged zone, that is, to raise the water outlet of the reactor to increase the area of the anaerobic zone and hydraulic retention time of the facility. This method can enhance the removal of nitrate, and this type of technology has been extensively studied. The second is to use amended media, which is also a hot spot in future research and technology development, that is, to replace part or all of the sandy substrate with a certain ratio of amended media to achieve higher pollutant removal performance. For example, using water treatment residue (coagulation residue rich in iron and aluminum) to enhance the removal of phosphates, using woodchip to enhance denitrification, and using vermiculite to improve the ammonia adsorption.

Although bioretention systems with amended media have achieved higher pollutant reduction than traditional bioretention systems, these amended media still face several problems, such as single function, secondary pollutant leaching, overgrowth of the heterotrophic microbial as well as clogging. For example, the most commonly used woodchip amendment can generate organic matter and improve denitrification, however, in-situ organic matter leaching in the early construction stage and the long-term dry period also exist. Moreover, the labile organic matter is gradually consumed in the long-term operation, which will lead to the decline of denitrification capacity and even the failure of facilities. In addition, the improvement of woodchips has little effect on the removal of phosphate and ammonia, and may even cause the production of two pollutants due to endogenous decomposition. As for the commonly used vermiculite and water treatment residues, they can only improve the removal capacity of one or two specific pollutants, making them hard to adapt to the complex characteristics of stormwater runoff pollutants. Nowadays, few related disclosures can simultaneously and efficiently achieve comprehensive stormwater pollutants removal.

Pyrite used to be deemed as a waste from the mining industry and a cause of acid mine pollution, but it can be used as an electron donor for denitrification as well. As an alternative to traditional heterotrophic denitrification technology, using pyrite as the electron donor for sulfur-based autotrophic technology has achieved several results in wastewater nitrogen treatment. However, pyrite, as a water-insoluble mineral, has a relatively low electron supply capacity and can only maintain a low rate of denitrification, which increases the hydraulic retention time and volume of wastewater treatment facilities, greatly limited its further application in wastewater treatment.

SUMMARY

Given the problems and limitations of the above-mentioned stormwater bioretention system and its substrate, the technical problem to be solved by the disclosure is to provide a stormwater runoff treatment substrate, which can durably improve the removal efficiency of common pollutants in stormwater runoff and reduce the generation of by-products. The disclosure also provides a stormwater bioretention system constructed with the substrate.

To solve the above technical problems, the disclosure provides a stormwater runoff treatment substrate, which comprises a lower pyrite substrate layer and an upper biochar substrate layer. The lower pyrite substrate layer comprises pyrite, oyster shell powder and sandy materials in a volume ratio of 10:5:85; the upper biochar substrate layer comprises biochar or activated carbon, organic nutrient soil and sandy materials, mixed in a volume ratio of 20:3:77.

In a class of this embodiment, the permeability coefficient of the upper biochar substrate layer is not less than 200 mm/h, the permeability coefficient of the lower pyrite substrate layer is not less than 300 mm/h, and the permeability coefficients of the upper biochar substrate layer and the lower pyrite substrate layer are not higher than 600 mm/h.

In a class of this embodiment, a mixture of 20% biochar, 3% organic nutrient soil, 3% 5-10 mesh quartz sand, 7% 10-20 mesh quartz sand, 40% 20-35 mesh quartz sand, 17% 30-60 mesh quartz sand, and 10% 60-120 mesh quartz sand by volume make up the upper biochar substrate layer.

In a class of this embodiment, a mixture of 10% pyrite with a particle size of 1-3 mm, 5% oyster shell with sheet length of 1-3 mm, 3% 5-10 mesh quartz, 2% 10-20 mesh quartz sand, 35% 20-30 mesh quartz sand, 25% 30-60 mesh quartz sand, and 20% 60-120 mesh quartz sand by volume make up of the lower pyrite substrate layer.

The above-mentioned stormwater runoff treatment substrate can automatically change the release of organic matter according to different stormwater conditions. It can also achieve particle pollution interception, ammonium nitrogen and organic matter adsorption and transformation, phosphate complexion and precipitation, and mixotrophic denitrification through upper biochar substrate layer and lower pyrite substrate layer cooperation, thereby improving the removal efficiency of common pollutants in stormwater runoff.

The disclosure provides a stormwater bioretention system constructed with the substrate, comprising a cell body, a gravel drainage layer, a transition layer, a lower pyrite substrate layer, an upper biochar substrate layer, a woodchip protective layer, and a ponding zone in the cell body from bottom to top. A perforated water collection pipe was installed in the gravel drainage layer and connected to the raised water outlet pipe. The height of the raised water outlet pipe is equal to the top height of the lower pyrite substrate layer. An overflow pipe is installed at the top of the cell body.

The following advantages are associated with the stormwater runoff treatment substrate of the disclosure:

1. This new substrate has an extensive pollutant treatment range. The upper biochar substrate layer can effectively adsorb and transform ammonia nitrogen, organic matter and other pollutants, and perform a certain degree of heterotrophic denitrification. The lower pyrite substrate layer can further perform autotrophic denitrification and produce iron and ferrous ions for phosphorus removal. A small amount of organic matter in the upper biochar substrate layer will be washed into the lower pyrite substrate layer and promote the mixotrophic denitrification as well as slight dissimilated nitrate reduction, which produces carbon dioxide and ammonium for the survival of autotrophic microorganisms.

2. The stormwater runoff treatment substrate is economical and environmentally friendly. Both pyrite and biochar are cost-effective materials and can turn waste into treasure. They are suitable for simple and decentralized passive stormwater treatment systems such as bioretention systems.

3. The stormwater runoff treatment substrate is stable and durable. As a mineral material, pyrite has high structural strength and chemical stability, and will not decompose too quickly or reduce the structural stability and efficiency of the bioretention system. On the contrary, microbial etching on the surface of the pyrite can increase the roughness of the pyrite. It provides better conditions for the attachment of microorganisms, which can stably facilitate the removal of nitrogen and phosphorus.

4. Stormwater bioretention system has high denitrification efficiency. Compared with the existing heterotrophic modified bioretention system, the stormwater bioretention system of this disclosure can achieve both autotrophic and heterotrophic denitrification. Autotrophic denitrification in the lower pyrite substrate layer plays an important role during the drought period, which greatly reduces the need for external organic matter addition and restricts the heterotrophic microorganisms overgrowth as well as organic matter leaching. Compared with the system with solo pyrite amendment, the introduction of heterotrophic denitrification greatly improves the denitrification capacity, and can effectively cope with heavy rainfall events which have high load and short hydraulic retention time.

5. The stormwater bioretention system has high utilization efficiency of cell body volume and fewer by-products. The particle size and permeability coefficient in the upper biochar substrate layer were strictly limited to an appropriate range. On the one hand, this will not reduce the water volume reduction performance of the system, on the other hand, it will effectively improve the volumetric water content of the upper substrate, expand the area of the anaerobic reaction area, then strengthen denitrification. Besides, the higher volumetric water content of the upper substrate can also strengthen the ability of the facilities to cope with long-term drought and maintain the water required by plants. At the same time, the layout also reduces the entry of dissolved oxygen into the lower pyrite substrate layer, then reduce the generation of sulfate and iron by-products by aerobic decomposition of pyrite.

6. The post-maintenance of the stormwater bioretention system is simple. After the long-term operation, the lower pyrite substrate layer will become more and more stable, and the sludge output is small, so there is no need for activation and maintenance; The upper biochar substrate layer may be blocked due to it will intercept a large number of particulate pollutants. Meanwhile, after the labile organic matter is consumed, the organic matter supply capacity of the upper biochar substrate layer may decline, resulting in the decline of heterotrophic denitrification capacity. These two problems can be maintained by retrofitting the surface of the upper biochar substrate layer with new labile organic matter, which is very convenient.

BRIEF DESCRIPTION OF THE DRAWINGS

The disclosure is described hereinbelow with reference to accompanying drawings, in which the sole FIGURE is a structural diagram of a stormwater bioretention system of the disclosure.

In the drawings, the following reference numbers are used: 1. Runoff guidance slope; 2. Woodchip protective layer; 3. Upper biochar substrate layer; 4. Lower pyrite substrate layer; 5. Transition layer; 6. Gravel drainage layer; 7. Overflow pipe; 8. Perforated water collection pipe; 9. Raised water outlet pipe; 10. Cell body; and 11. Ponding zone.

DETAILED DESCRIPTION

To further illustrate, embodiments detailing a stormwater runoff treatment substrate are described below. It should be noted that the following embodiments are intended to describe and not to limit the disclosure.

The concept of the disclosure is that compared with wastewater, stormwater has different hydraulic and water quality conditions and physical and chemical properties. First, the stormwater pollutant concentration is lower, which can adapt to the trait of the less electron supply rate of pyrite system; Second, stormwater treatment facilities are usually operated intermittently, which can provide sufficient hydraulic retention time in the dry period, to meet the characteristics of long retention time for pyrite denitrification; Thirdly, pyrite denitrification is mainly autotrophic denitrification, and its sludge yield is lower, which helps to maintain the good hydraulic performance of bioretention and meets the needs of low maintenance of bioretention facilities; Fourth, pyrite is cost-effective and durable, does not need complex material synthesis or processing, and can turning waste into treasure, which meets the requirements of simple structure and economic saving of stormwater bioretention system.

The preparation of stormwater runoff treatment substrate of the disclosure:

The preparation of stormwater runoff treatment substrate has high requirements. If the ratio is inappropriate, it may lead to several problems, such as uneven ratio can lead to facility collapse and particle leakage; Too small particle size will lead to poor hydraulic conditions and blockage; Too coarse particle size will lead to low pollutant removal capacity, poor water retention and difficult for plants survival.

The following example provides a substrate ratio considering various needs, which can be suitable for common stormwater quality and quantity conditions:

In the upper biochar substrate layer, the volume ratio is: 5-10 mesh quartz sand 3%, 10-20 mesh quartz sand 7%, 20-35 mesh quartz sand 40%, 30-60 mesh quartz sand 17%, 60-120 mesh quartz sand 10%, powdered biochar 20% and organic peat soil 3%; The D50 after mixing is about 0.48 mm.

In the lower pyrite substrate layer, the volume ratio is: 5-10 mesh quartz sand 3%, 10-20 mesh quartz sand 2%, 20-30 mesh quartz sand 35%, 30-60 mesh quartz sand 25%, 60-120 mesh quartz sand 20%, 1-3 mm pyrite 10% and oyster shell powder 5%; The D50 after mixing is about 0.51 mm.

The quartz sand mentioned above can also be replaced by river sand.

The key to the preparation of stormwater runoff treatment substrate is to select sandy materials with different particle sizes and gradations in a certain proportion. This certain range of particle size distribution will make the permeability coefficient of mixed materials is into a suitable range. The permeability coefficient is tested by the equal head method. The permeability coefficient of the lower pyrite substrate layer is not less than 300 mm/h, and the permeability coefficient of the upper biochar substrate layer is not less than 200 mm/h, both are not more than 600 mm/h. This range of permeability coefficients can make the bioretention system not only meet the needs of water reduction and plant growth but also ensure good pollutant reduction capacity.

As shown in the sole FIGURE, the stormwater bioretention cell of the disclosure comprises a cell body 10, in which there are gravel drainage layer 6, transition layer 5, lower pyrite substrate layer 4, upper biochar substrate layer 3, woodchip protective layer 2, and ponding zone 11 from bottom to top. A perforated water collection pipe 8 is installed in the gravel drainage layer 6, and the perforated water collection pipe 8 is connected to the raised water outlet pipe 9, the elevation of the raised water outlet pipe 9 is equal to the top height of the lower pyrite substrate layer 4, and an overflow pipe 7 is installed at the top of the cell body 10.

A runoff guidance slope 1 is set along the edge of cell body 10. The woodchips of the woodchip protective layer 2 are 1-2 cm long, and the woodchip can choose bark. The transition layer 5 is a sand layer with a particle size larger than the lower pyrite substrate layer and smaller than the gravel drainage layer, which is used to prevent particles from the lower pyrite substrate layer from leaking into the gravel drainage layer and blocking the perforated water collection pipe.

The purpose of activation at the initial operation of the stormwater bioretention cells is to accelerate the maturity of the microorganism in the cells (This step can also be abandoned and make the bioretention accept natural rainfall to mature). Specifically, before the first operation, a culture medium with tap water or stormwater as solvent immersed in the lower pyrite substrate layer is inversely introduced from the raised water outlet pipe 9 to promote the proliferation of sulfur autotrophic denitrification microorganisms in the lower pyrite substrate layer. The components of the culture medium are 0.2 g/L $KNO_3$, 0.05 g/L $NH_4Cl$, 0.5 g/L $Na_2S_2O_3 \cdot 5H_2O$ and 0.02 g/L $KH_2PO_4$. After the long-term operation, when the treatment effect of stormwater bioretention cell decreases, the maintenance can be applied by renovating the upper biochar substrate layer, adding organic materials such as peat soil, or replacing the top woodchip protective layer using new woodchips.

It is assumed that the ratio of the surface area of the stormwater bioretention cell to the catchment area of the cell is 1:20, and the runoff coefficient is 0.75. When the cell deals with low-intensity rainfall (It is defined as the rainfall within 12 hours is not more than 14.9 mm), the stormwater collected in the system enters the cell body through the runoff guidance slope, large particles and suspended solids are intercepted by the woodchip protective layer, stormwater infiltrates into the upper biochar substrate layer, and the upper biochar substrate layer adsorbs ammonia nitrogen and organic matter. At the same time, the lower part of the upper biochar substrate layer uses organic matter for heterotrophic denitrification to remove part of nitrate nitrogen. Then the stormwater enters the lower pyrite substrate layer which the pyrite is used for autotrophic denitrification to remove nitrogen, and the generated iron ions are complexed with dissolved phosphate for phosphorus removal. At this time, because the total flow received by the bioretention cell is less, the hydraulic load is low and the dissolution of organic matter is less. When the rainfall stopped, the remaining nitrate was removed by autotrophic denitrification in the lower pyrite substrate layer. In the next rainfall, the treated stormwater in the lower pyrite substrate layer will be replaced by new stormwater, to continue the above pollution reduction steps.

When dealing with high-intensity rainfall, the removal process is similar to that of low-intensity rainfall. However, due to the larger runoff volume generated during high-intensity rainfall and the permeability coefficient of the upper biochar substrate layer is in the range of 200-600 mm/h, the stormwater will not permeate immediately, but will gradually gather in the ponding zone, making the stormwater bioretention cells operate at full hydraulic load. This will increase the water head difference, moisture content and infiltration rate of the system, strengthen the scouring and organic matter dissolution, greatly improve heterotrophic denitrification, and offset the low rate of nitrogen removal using pyrite only, making the stormwater bioretention cells still has excellent pollutant removal efficiency under heavy stormwater even.

Comparative Test

1. Test of Pollutant Leakage at the Beginning of Operation

Compared with the traditional sand bioretention system and the woodchip modified bioretention system, the stormwater bioretention system of the disclosure has the advantage of low pollutant leaching. Taking tap water as the influent, we compared and tested the indicators such as Kjeldahl nitrogen (TKN), nitrate nitrogen ($NO_3^-$—N), nitrite nitrogen ($NO_2^-$—N), total nitrogen (TN), total phosphorus (TP), chemical oxygen demand (COD) and ultraviolet absorbance at 254 nm ($UV_{254}$) of the above three bioretention cells. The test results of pollutant leakage after one month of initial operation of the cells are shown in Table 1.

TABLE 1

Mean value of pollutant leaching concentration (mg/L)

| Bioretention system | Kjeldahl nitrogen | Nitrate nitrogen | TN | TP | COD | $UV_{254}$ |
|---|---|---|---|---|---|---|
| Bioretention system of disclosure | 0.48 | 0.43 | 0.95 | 0.42 | 19.4 | 0.199 |
| Traditional sand bioretention system | 0.73 | 0.90 | 1.71 | 0.52 | 26.7 | 0.325 |
| Woodchip modified bioretention system | 0.92 | 0.48 | 1.43 | 1.56 | 65.3 | 0.595 |

It can be seen from Table 1 that the pollutant leaching concentration of the disclosure is significantly lower than that of the two existing bioretention systems.

Although total iron and sulfate will be generated during pyrite-based autotrophic denitrification or oxidation, the concentration of these two by-products is very low in the bioretention system of disclosure, the net leaching of sulfate is generally not more than 10 mg/L.

Except for the first two operations during the start up phase, the total iron generation is stably below 0.3 mg/l, which meets the requirements for total iron in class III water body of Quality standard for groundwater of China (GBT-14848-2017).

2. Pollutant Removal Efficiency Test

To test the pollutant removal efficiency, we test the stormwater bioretention system of the disclosure, the traditional sand bioretention system and the woodchip modified bioretention system using synthetic stormwater.

Assuming that the service area ratio of facilities is 1:20, the runoff coefficient is 0.75, the rainfall duration is 2 h, and the rainfall is 25 mm. 10 large-scale rainfall events are simulated and the pollutant removal efficiency is calculated. The results of pollutant removal are shown in Table 2.

TABLE 2

Average removal efficiency of simulated runoff pollutant (%)

| Bioretention system | Kjeldahl nitrogen | Nitrate nitrogen | TN | TP | COD |
|---|---|---|---|---|---|
| Bioretention system of disclosure | 85.2 | 41.7 | 67.4 | 80.3 | 76.3 |
| Traditional sand bioretention system | 63.7 | 1.8 | 39.1 | 45.2 | 68.5 |
| Woodchip modified bioretention system | 78.0 | 54.6 | 68.2 | 16.0 | 35.6 |

It can be found that this disclosure can achieve excellent pollutant removal performance even under heavier rainfall events. Compared with the traditional sand bioretention system, the pollutant removal performance of this disclosure was higher. Compared with the woodchip-modified system, although nitrate removal in the current disclosure was slightly lower, the TN removal performance was almost equal, and this new disclosure achieved significantly higher COD and TP removal performance.

It will be obvious to those skilled in the art that changes and modifications may be made, and therefore, the aim in the appended claims is to cover all such changes and modifications.

What is claimed is:

1. A stormwater bioretention system comprising a cell body, wherein a gravel drainage layer, a transition layer, a pyrite substrate layer, a biochar substrate layer, a woodchip protective layer, a ponding zone, a perforated water collection pipe, a raised water outlet pipe, and an overflow pipe, wherein: the gravel drainage layer is disposed at a bottom of the cell body; the transition layer is disposed above the gravel drainage; the pyrite substrate layer is disposed above the transition layer, and wherein the pyrite substrate layer comprises a mixture of pyrite, oyster shell powder, and a first quartz sand in a volume ratio of 10:5:85; the biochar substrate layer is disposed above the pyrite substrate layer, and wherein the biochar substrate layer comprises a mixture of biochar, organic nutrient soil, and a second quartz sand in a volume ratio of 20:3:77; the woodchip protective layer is disposed above the biochar substrate layer; the ponding zone is disposed above the woodchip protective layer; the perforated water collection pipe is disposed in the gravel drainage layer, and the perforated water collection pipe is connected to the raised water outlet pipe; a height of the raised water outlet pipe is equal to a height of a top of the pyrite substrate layer, and an the overflow pipe is disposed at a top opening of the cell body.

2. The stormwater bioretention system of claim 1, wherein an edge of an entrance of the cell body is provided with a runoff guidance slope, and a woodchip of the woodchip protective layer is 1-2 cm long.

3. The stormwater bioretention system of claim 1, wherein the transition layer is a sand layer with a particle size larger than the pyrite substrate layer and smaller than the gravel drainage layer.

4. The stormwater bioretention system of claim 1, wherein a permeability coefficient of the biochar substrate layer is between 200 mm/h and 600 mm/h; and a permeability coefficient of the pyrite substrate layer is between 300 mm/h and 600 mm/h.

5. The stormwater bioretention system of claim 1, wherein the biochar substrate layer comprises the mixture of 20 vol. % of the biochar, 3 vol. % of the organic nutrient soil, 3 vol. % of 5-10 mesh of the second quartz sand, 7 vol. % of 10-20 mesh of the second quartz sand, 40 vol. % of 20-35 mesh of the second quartz sand, 17 vol. % of 30-60 mesh of the second quartz sand, and 10 vol. % of 60-120 mesh of the second quartz sand.

6. The stormwater bioretention system of claim 1, wherein the pyrite substrate layer comprises the mixture of 10 vol. % of the pyrite with a particle size of 1-3 mm, 5 vol. % of the oyster shell powder with a sheet length of 1-3 mm, 3 vol. % of 5-10 mesh quartz, 2 vol. % of 10-20 mesh of the first quartz sand, 35 vol. % of 20-30 mesh of the first quartz sand, 25 vol. % of 30-60 mesh of the first quartz sand, and 20 vol. % of 60-120 mesh of the first quartz sand.

* * * * *